(12) United States Patent
Armstrong (10) Patent No.: US 6,344,791 B1
(45) Date of Patent: *Feb. 5, 2002

(54) VARIABLE SENSOR WITH TACTILE FEEDBACK

(76) Inventor: Brad A. Armstrong, P.O. Box 1419, Paradise, CA (US) 95967

(*) Notice: Subject to any disclaimer, the term of this patent is extended or adjusted under 35 U.S.C. 154(b) by 0 days.

This patent is subject to a terminal disclaimer.

(21) Appl. No.: 09/599,095

(22) Filed: Jun. 21, 2000

Related U.S. Application Data (63) Continuation of application No. 09/122,269, filed on Jul. 24, 1998, now Pat. No. 6,135,886.

(51) Int. Cl.[7] .............................................. H01C 10/10
(52) U.S. Cl. .......................... 338/114; 463/37; 338/99
(58) Field of Search ..................... 463/36–37; 345/156, 345/159, 161; 273/148 R, 459–460; 338/99, 114, 47

(56) References Cited

U.S. PATENT DOCUMENTS

| 3,611,068 A | 10/1971 | Fujita |
| 3,771,037 A | 11/1973 | Bailey |
| 3,806,471 A | 4/1974 | Mitchell |

(List continued on next page.)

FOREIGN PATENT DOCUMENTS

| DE | 3031484 | 11/1982 |
| DE | 3543890 | 6/1987 |
| DE | 3634912 | 4/1988 |
| DE | 4019211 | 1/1991 |
| DE | 19606408 | 8/1997 |
| EP | 0337458 | 10/1989 |
| EP | 0470615 | 2/1992 |
| EP | 0579448 | 1/1994 |
| EP | 1080753 | 3/2001 |
| GB | 2058462 | 4/1981 |
| GB | 2113920 | 8/1983 |
| GB | 2233499 | 1/1991 |
| GB | 2267392 | 12/1993 |
| GB | 2308448 | 6/1997 |
| JP | 601 75401 | 9/1985 |
| JP | 62160623 | 7/1987 |
| JP | 02158105 | 6/1990 |
| JP | 03108701 | 5/1991 |
| JP | 04155707 | 5/1992 |
| JP | 05151828 | 6/1993 |
| JP | 5-87760 | 11/1993 |
| JP | 6154422 | 6/1994 |
| JP | 7281824 | 10/1995 |
| JP | 7302159 | 11/1995 |
| JP | 09213168 | 8/1997 |
| JP | 9218737 | 8/1997 |
| JP | 09223607 | 8/1997 |
| JP | 11031606 | 2/1999 |
| RU | 2010369 | 3/1994 |
| WO | WO9532776 | 12/1995 |
| WO | WO9957630 | 11/1999 |

OTHER PUBLICATIONS

S.F. Kambic, IBM Technical Disclosure Bulletin, vol. 20 No. 5 Oct. 1977.
Questel–Orbit QWEB pp. 1–24 (submitted herewith) The Individual "Questel" disclosures are herein–individually listed, and full and "best" copies are provided for review.
IBM Technical Disclosure Bulletin pp. 230–235 Feb. 1990 Mouse Ball–Actuating Device With Force And Tactile Feedback Research Disclosure Nov. 1987 28373 Joystick with Tactile Feedback.

*Primary Examiner*—Michael O'Neill
*Assistant Examiner*—Scott E. Jones

(57) ABSTRACT

Structures and methods for using an analog sensor in combination with a user discernable snap-through threshold feedback, the feedback may be created by a dome-cap element of the sensor. The threshold feedback, sensed by a human user's finger, indicates activation and deactivation of the analog sensor. Tactile analog sensor(s) are structurally combined with: a second kind of tactile feedback referred to as active tactile feedback, flexible sheet sensor elements, pivotal analog buttons, and game imagery controls.

66 Claims, 4 Drawing Sheets

U.S. PATENT DOCUMENTS

| | | | | |
|---|---|---|---|---|
| 3,952,173 | A | 4/1976 | Tsuji et al. | |
| 3,988,556 | A | 10/1976 | Hyodo | |
| 4,224,602 | A | 9/1980 | Anderson | |
| 4,268,815 | A | 5/1981 | Eventoff | |
| 4,276,538 | A | 6/1981 | Eventoff | |
| 4,301,337 | A | 11/1981 | Eventoff | |
| 4,313,113 | A | 1/1982 | Thornburg | |
| 4,314,228 | A | 2/1982 | Eventoff | |
| 4,315,238 | A | 2/1982 | Eventoff | |
| 4,552,360 | A | 11/1985 | Bromley et al. | |
| 4,615,252 | A | 10/1986 | Yamauchi et al. | |
| 4,673,919 | A | 6/1987 | Kataoka | |
| 4,694,231 | A | 9/1987 | Alvite | |
| 4,733,214 | A | 3/1988 | Andersen | |
| 4,786,895 | A | 11/1988 | Castaneda | |
| 4,866,542 | A | 9/1989 | Shimada et al. | |
| 4,975,676 | A | 12/1990 | Greenhalgh | |
| 5,059,958 | A * | 10/1991 | Jacobs et al. | 340/706 |
| 5,103,404 | A | 4/1992 | McIntosh | |
| 5,132,658 | A | 7/1992 | Dauenhauer | |
| 5,164,697 | A | 11/1992 | Kramer | |
| 5,189,355 | A | 2/1993 | Larkins et al. | |
| 5,196,782 | A | 3/1993 | D'Aleo et al. | |
| 5,200,597 | A | 4/1993 | Eastman | |
| 5,207,426 | A * | 5/1993 | Inoue et al. | 273/148 B |
| D342,740 | S | 12/1993 | Parker | |
| 5,286,024 | A * | 2/1994 | Winblad | 273/148 B |
| 5,287,089 | A | 2/1994 | Parsons | |
| 5,311,779 | A | 5/1994 | Teruo | |
| 5,315,204 | A | 5/1994 | Park | |
| 5,364,108 | A | 11/1994 | Esnouf | |
| 5,365,494 | A | 11/1994 | Lynch | |
| 5,376,913 | A | 12/1994 | Pine et al. | |
| 5,396,235 | A | 3/1995 | Maeshima | |
| 5,440,237 | A | 8/1995 | Brown et al. | |
| 5,457,478 | A | 10/1995 | Frank | |
| 5,510,812 | A * | 4/1996 | O'Mara et al. | 345/161 |
| 5,550,339 | A | 8/1996 | Haugh | |
| 5,555,004 | A * | 9/1996 | Ono et al. | 345/161 |
| 5,565,891 | A | 10/1996 | Armstrong | |
| 5,589,828 | A | 12/1996 | Armstrong | |
| 5,640,566 | A | 6/1997 | Victor et al. | |
| 5,670,955 | A | 9/1997 | Thorne et al. | |
| 5,673,237 | A | 9/1997 | Blank | |
| 5,675,329 | A | 10/1997 | Barker | |
| 5,689,285 | A * | 11/1997 | Asher | 345/159 |
| 5,764,219 | A * | 6/1998 | Rutledge et al. | 345/159 |
| 5,778,404 | A | 7/1998 | Capps et al. | |
| 5,790,102 | A | 8/1998 | Nassimi | |
| 5,847,305 | A | 12/1998 | Yoshikawa et al. | |
| 5,847,639 | A | 12/1998 | Yaniger | |
| 5,854,624 | A | 12/1998 | Grant | |
| 5,867,808 | A | 2/1999 | Selker et al. | |
| 5,883,619 | A | 3/1999 | Ho | |
| 5,889,236 | A | 3/1999 | Gillespie et al. | |
| 5,895,471 | A | 4/1999 | King et al. | |
| 5,898,359 | A | 4/1999 | Ellis | |
| 5,910,798 | A | 6/1999 | Kim | |
| 5,923,317 | A * | 7/1999 | Sayler et al. | 345/156 |
| 5,943,044 | A | 8/1999 | Martinelli | |
| 5,948,066 | A | 9/1999 | Whalen et al. | |
| 5,963,196 | A * | 10/1999 | Nishiumi et al. | 345/161 |
| 5,974,238 | A | 10/1999 | Chase | |
| 5,984,785 | A * | 11/1999 | Takeda et al. | 463/38 |
| 5,995,026 | A | 11/1999 | Sellers | |
| 5,999,084 | A * | 12/1999 | Armstrong | 338/114 |
| 6,020,884 | A | 2/2000 | MacNaughton | |
| 6,049,812 | A | 4/2000 | Bertram | |
| 6,102,802 | A * | 8/2000 | Armstrong | 463/37 |
| 6,118,979 | A | 9/2000 | Powell | |
| 6,135,886 | A * | 10/2000 | Armstrong | 463/37 |
| 6,157,935 | A | 12/2000 | Tran et al. | |
| 6,185,158 | B1 | 2/2001 | Ito et al. | |
| 6,198,473 | B1 | 3/2001 | Armstrong | |
| 6,208,271 | B1 | 3/2001 | Armstrong | |
| 6,222,525 | B1 | 4/2001 | Armstrong | |

* cited by examiner

VARIABLE SENSOR WITH TACTILE FEEDBACK

This is a 1.53(b) continuation of U.S. application Ser. No. 09/122,269 filed Jul. 24, 1998, now U.S. Pat. No. 6,135,886 granted Oct. 24, 2000.

The benefits of the earlier filing date(s) is hereby claimed for the common matter between this disclosure and my pending U.S. patent application Ser. No. 09/122,269 filed Jul. 24, 1998 which in turn claims the benefit of the earlier filing date of U.S. patent application Ser. No. 08/942,450 filed Oct. 1, 1997, the benefit of which is also claimed. All of the benefits of the earlier filing date is also hereby claimed for the common matter between this disclosure and my pending U.S. patent application Ser. No. 08/677,378 filed Jul. 5, 1996.

BACKGROUND OF THE INVENTION

1. Field of the Invention

This invention relates generally to sensors utilizing injection molded flexible dome-caps such as are used in the prior art as simple momentary-On electrical switches. The present invention is specifically directed toward new uses of elastomeric flexible injection molded dome-cap sensors, specifically using such devices in a novel manner as analog sensors.

2. Description of the Related Prior Art

Elastomeric or flexible injection molded dome-cap momentary-On switches (sensors) are well known and widely used in the prior art as switches incorporated in such common host devices as remote controls for televisions and stereos, and in electronic game control devices such as game pads for Nintendo, Sony and Sega game consoles, and some computer keyboards, etc. In all of the above mentioned host devices and in all known prior art where the elastomeric dome-cap sensor is employed, the injection molded dome-cap is always used as a component of a sensor having a single threshold serving as a simple make or break (closed or open) electrical switch in a circuit.

The term elastomeric is used to describe any rubber-like material, whether natural or synthetic.

Structurally, the prior art elastomeric injection molded dome-cap carries a normally raised conductive element or disk referred to as a pill or a carbon pill. The conductive pill is herein sometimes referred to as the "active element". The active element in prior art elastomeric injection molded dome-cap sensors is believed to be made of a binder of elastomeric or rubbery material binding carbon or carbon containing material and possibly other materials. The active element is located at the top inside of the non-conductive elastomeric dome-cap and above two proximal highly conductive elements or traces so that with depression of the dome-cap, such as with pressure applied by a finger, the active element is moved with the collapsing dome-cap into contact with both proximal conductive elements and closes an otherwise normally open circuit. Since the injection molded dome-cap is resilient, with release of pressure on the dome-cap it returns to a raised position carrying the active element with it to open the circuit. Electronic circuitry associated with the two proximal conductive elements, which are either bridged or not bridged by the active element of the elastomeric dome-cap, is circuitry which in the prior art has always been structured only to detect or read a threshold event, i.e., an open or closed (binary) state across the proximal conductive elements.

As those skilled in the art appreciate, most, but not all elastomeric injection molded dome-caps when depressed produce a soft snap which is a user discernable tactile feedback. This tactile feedback occurs when the dome-cap is depressed beyond a given point; the point being where a mechanical threshold is crossed and the tactile snap is produced. The snap defining the tactile sensation occurs just prior to the active element being brought into contact with the two proximal conductive elements. The tactile sensation is perceived by the user as occurring at the same time the sensor is activated, which in the prior art is when the switch is closed. The switch remains closed until such time as the user releases pressure on the dome-cap, at which time the dome-cap being made of elastomeric material returns to a raised position carrying the active element with it and off of the proximal conductive elements. The elastomeric injection molded dome-cap typically again produces a tactile sensation as it moves upward crossing the mechanical snap-through threshold. Elastomeric injection molded dome-caps are typically molded or are made primarily of thermoset rubber, are one-piece absent joints or seams, and provide excellent durability for a very low cost. The active element in the prior art is typically adhered to the inside top of the dome-cap during the injection molding phase of manufacturing the dome-cap.

Another type of prior art sensor is described in U.S. Pat. No. 3,806,471 issued Apr. 23, 1974 to R. J. Mitchell for "PRESSURE RESPONSIVE RESISTIVE MATERIAL". Mitchell describes sensors which utilize pressure-sensitive variable-conductance material to produce analog outputs. Mitchell does not use or suggest an elastomeric injection molded dome-cap used to either carry variable-conductance material or to transfer finger applied pressure into variable-conductance material. Mitchell also fails to recognize any need for or suggest the use of an elastomeric injection molded dome-cap to provide tactile feedback to the user upon actuation or de-actuation of the pressure-sensitive variable-conductance sensor. U.S. Pat. No. 4,315,238 issued Feb. 9, 1982 to F. Eventoff describes a pressure-sensitive bounceless switch absent a suggestion of using an elastomeric injection molded one-piece dome-cap or providing tactile feedback, and is thus considered to be cumulative prior art to the Mitchell disclosure.

There have been hundreds of millions of momentary-On elastomeric dome-cap style switches made and sold in the last 20 years. Pressure-sensitive variable-conductance sensors have also been known for decades and have always been quite expensive compared to elastomeric injection molded dome-cap switches. The prior art does not suggest the use of an inexpensive elastomeric injection molded dome-cap containing any pressure-sensitive variable-conductance material in association with circuitry structured for control or manipulation by the elastomeric dome-cap sensor applied as an analog sensor, or as a pressure-sensitive variable-conductance sensor which includes tactile feedback in association with circuitry structured for control or manipulation by the elastomeric dome-cap sensor applied as an analog sensor. Clearly an inexpensive injection molded elastomeric dome-cap pressure-sensitive variable-conductance sensor would be useful and of benefit, as also would be such a sensor having tactile feedback. Such sensors would be useful in a wide variety of applications wherein human input is required. Such applications include home electronics, computers and generally, but not limited to, devices operated by the human hand/finger inputs.

I have discovered, as will be detailed below, that a typical elastomeric injection molded dome-cap type switch when used as part of a novel structural combination or in a novel method fills a long standing need for a very inexpensive and durable pressure-sensitive variable-conductance sensor, and further one which can, if desired, supply tactile feedback.

SUMMARY OF THE INVENTION

The following detailed description is of best modes and preferred structures for carrying out the invention, and although there are clearly some changes which can be made to that which is specifically herein described and shown, for the sake of briefness of this disclosure, all of these changes which fall within the scope of the present invention have been not herein detailed, but will become apparent to those skilled in the art with a study of this disclosure. The specifications of my pending and allowed U.S. patent applications Ser. No. 09/122,269 filed Jul. 24, 1998, Ser. No. 08/942,450 filed Oct. 1, 1997, and Ser. No. 08/677,378 filed Jul. 5, 1996 are all herein incorporated by reference.

The prior art dome-cap sensors as described above have been always used as simple On/Off switches or bounceless On/Off switches in associated circuitry structured to use the sensor only as a switch. I have discovered that the active element of such prior art dome-cap sensors is pressure-sensitive and variably conductive to a useful degree, and this property of the active element can be used not only as a bounceless switch, but much more importantly as an analog or variable pressure sensor. With applied varying pressure changes, the active element changes it's conductivity, i.e., resistivity, relative to the applied pressure. The active element, while a moderate to poor conductor when not under compressive force, drops in resistivity when placed under compressive force, such drop in resistivity being related to the amount of compression of the active element. This pressure-sensitive variable-conductance aspect of the active element in the elastomeric injection molded one-piece dome-cap opens many new and valuable possibilities of use.

Such new possibilities include very low cost pressure-sensitive variable-conductance sensors allowing integration into a multitude of price sensitive consumer electronic items. In the past, variable-conductance sensors incorporated into consumer electronic devices were relatively expensive potentiometers and sliding plate resistors, or pressure-sensitive sensors which have typically been even more expensive, running from a few dollars and upward per sensor, and thus such pressure-sensitive sensors are sparingly used. On the other hand, elastomeric dome-cap sensors are currently manufactured in very high volume for a very low cost.

The elastomeric injection molded dome-cap provides an extremely low cost member capable of serving multiple functions all of which can be advantageous and beneficial for a pressure-sensitive variable-conductance sensor. Such multiple functions of the elastomeric one-piece injection molded dome-cap can include: the dome-cap serving as an inexpensive return spring for ensuring termination of pressure on the active element; the top exterior of the dome-cap providing a finger engagement surface when properly fashioned for serving as a finger placement surface on which a user can press absent a requirement of additional button caps or triggers atop the dome-cap; a seal or debris excluder over electric component surfaces which could be adversely affected by the entrance of foreign matter; tactile feedback to the user upon actuation and de-actuation of the active element or sensor; an ergonomically correct depressible surface which is variably depressible through a wide range, generally absent an uncomfortable hard-stop at the bottom of the depressive stroke; and the injection molded dome-cap providing these functions can be mounted on various base materials such as flexible membrane circuit sheets, rigid circuit boards and flexible membranes supported or stiffened by rigid boards which can themselves possess circuitry.

Additionally, the injection molded dome-cap can be manufactured in multiple dome-caps in a single injection molded sheet wherein all of the dome-caps can be utilized as novel pressure sensors or some of the dome-caps can be novel pressure sensors mixed with other dome-caps used as traditional momentary-On switches. Such multiple dome-cap sheets can be highly useful in devices such as television, and the like, remote control devices wherein many functions may be best served with momentary-On switches while other functions (e.g. channel and/or volume scrolling buttons) can be best served with variable-conductance pressure sensors, preferably using the teachings herein.

Durable and low cost pressure-sensitive analog sensors would be of benefit in many host devices to offer the user increased control options, the ability to variably increase and reduce the sensor output dependant on pressure exerted by the user to the dome-cap so that, for example, images may selectively move faster or slower on a display, timers, settings within a range, adjustments and the like may change faster or slower dependant on the pressure applied by the user.

Another benefit of the use of my discovery is in game pads of the type which traditionally have elastomeric dome-cap sensors used only as momentary-On sensors, but with the present invention, the user can press harder to make a controllable character jump higher or run faster for example.

Another benefit of the use of my discovery is in mouse type computer control devices which may have a two or four way rocker for scrolling windows. These currently existing mouse controllers utilize momentary-On switches, some being elastomeric dome-caps, and all would be greatly advantaged with use of the novel analog dome-cap sensors described herein.

Another benefit of the use of my discovery is in keyboard type computer control devices which may have a two or four way rocker, or independent keys, for scrolling windows. Such a novel computer keyboard would be greatly advantaged with use of the novel analog dome-cap sensors described herein.

Another benefit of the use of my discovery is in joystick type devices having buttons and/or trigger on the handle. Such buttons and/or trigger, which in the prior art are momentary-On switches, can be benefited by implementation of the present invention.

Another benefit of the use of my discovery is in ease of changeover by manufactures who currently make host devices including housings with circuit boards therein, elastomeric dome-cap sensors associated with the circuit boards, openings through the housings to allow access to the dome-caps to allow depression thereof, and in some cases button and/or trigger style covers over the injection molded dome-caps. In order to gain the benefit of the present invention, such manufacturers will only need to apply new or modified circuitry on the circuit boards capable of reading any one of at least three readable states (electric states) or many more of the dome-cap sensor indicative of at least three states of the dome-cap and active element which can represent at least: 1) no pressure thereon, 2) low pressure and 3) high pressure applied to the dome-cap and thus the active element. Preferably, the dome-cap sensor will be employed in a manner wherein not just three but many states are read, thus ensuring high resolution reading of a variably changing input.

For the purposes of this disclosure, plural states in reference to the prior art means two states only, typically being On or Off since the dome-cap sensors are used only as On/Off switches in the prior art, and in reference to the present invention, plural states is three or more states as will be further detailed.

Yet another benefit of the use of my discovery is that not only can a typical prior art dome-cap style switch be used as a pressure-sensitive variable-conductance sensor, but if desired, such a sensor can also supply the user with a tactile feedback on actuation of the sensor, and even further upon de-activation of the sensor. Benefits of the tactile feedback include a reduction of potential confusion on the part of the user as to when the sensor is actuated and de-actuated. For example, if an analog sensor or sensor used as an analog sensor of the type not having tactile feedback is minimally activated, it is difficult for the user in some instances to determine whether the sensor is still minimally activated or is entirely de-activated. If the user is playing an electronic game utilizing a variable pressure analog sensor to control movement as he slowly approaches the edge of a cliff which he might fall off of, and the user desires to get very close to the edge but not fall off, the user would be depressing very lightly on the sensor, and absent tactile feedback would not be immediately aware when he inadvertently decreased the depression enough to fully deactivate the sensor.

These, and other advantages and benefits of the present invention will become increasingly appreciated with continued reading and a review of the included drawings.

BEST MODES FOR CARRYING OUT THE INVENTION

A detailed description of the principles of the present invention will now ensue with reference to the included drawings.

Figure 1:
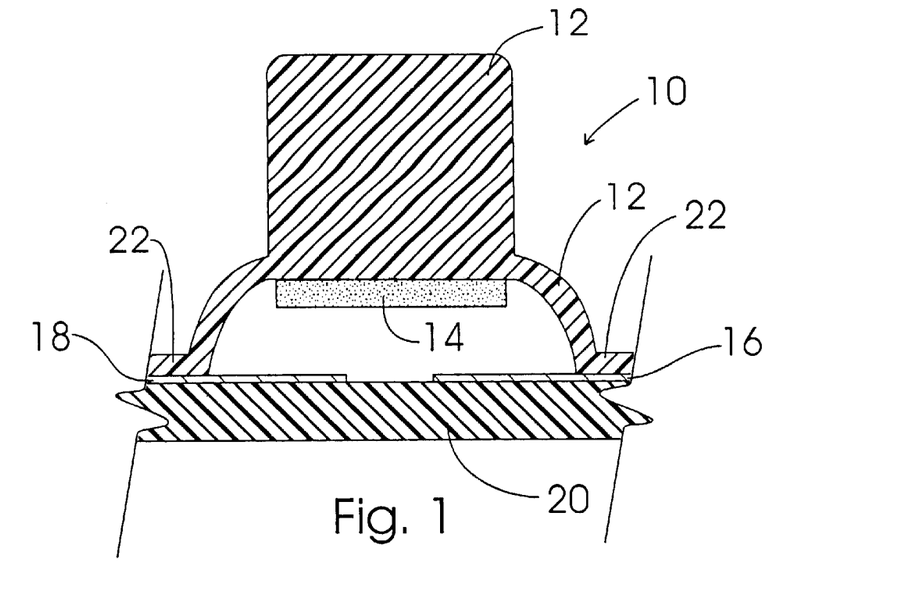
FIG. 1 shows a median cross section view of an elastomeric injection molded one-piece dome-cap sensor. The sensor is shown with the active element attached to the underside or bottom of the raised dome-cap and thus the active element is carried by and within the dome-cap.

FIG. 1 shows a median cross section view of an elastomeric dome-cap sensor 10 in accordance with the prior art as can be used in a novel new use of such a sensor in accordance with the present invention, and in a novel new structural arrangement as herein disclosed in accordance with the present invention. Sensor 10 is shown in the deactivated state or condition with the elastomeric one-piece injection molded dome-cap 12 raised and thus the active element 14, i.e., conductive pill is shown raised and disengaged from the two proximal conductive elements 16, 18. The active element 14 is attached to the underside of dome-cap 12 and is thus carried by the dome-cap, the attaching most commonly being by the dome-cap 12 being formed by injection molding to the pre-formed active element 14 which has been inserted into the molding cavity prior to the injecting of the thermoset rubber commonly used to make highly durable dome-caps 12. Multiple shot injection or adhesive attachment or any other suitable connection can be used to connect active element 14 to injection molded dome-cap 12. Conductive elements 16, 18 are shown attached to or supported by a typically non-conductive base 20 which is a circuit board, flexible membrane sheet, combination thereof or the like. Dome-cap 12 is typically hemi-spherically or alternatively conically shaped and smaller at the end thereof furthest from base 20, and thus typically annular at the larger end thereof; and is shown with an outward extending flange 22 at it's bottom end extending parallel to base 20. Flange 22 is typically integrally injection molded or in one-piece with the balance of dome-cap 12. Flange 22 can be adhered in place to base 20 such as with adhesives or dome-cap 12 can be otherwise held in proper location to base 20 and conductive elements 16, 18 such as with mechanical restraints, as for example by sandwiching flange 22 between portions of a housing or the like, or by having the upper portion of dome-cap 12 positioned within a movement restricting opening in a housing which only allows the upper portion to move toward and away from base 20 and conductive elements 16, 18.

Figure 3:
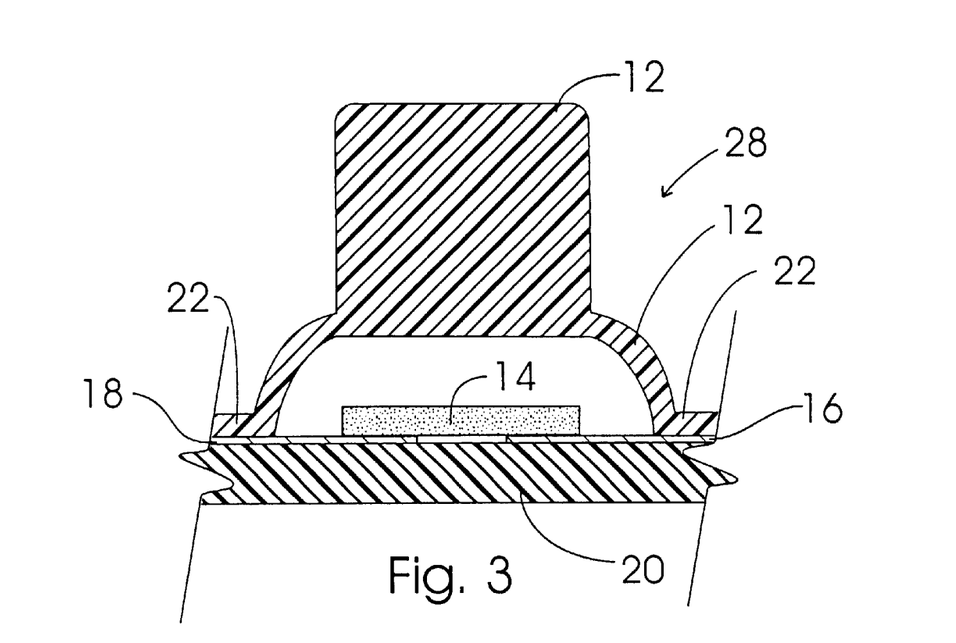
FIG. 3 shows a median cross section view of an elastomeric injection molded one-piece dome-cap sensor. The shown sensor is a structural arrangement wherein the active element is shown atop and spanning across the two proximal conductive elements and within the injection molded dome-cap but not carried by the dome-cap. The elastomeric injection molded dome-cap is shown in a raised position above the active element.
Figure 6:
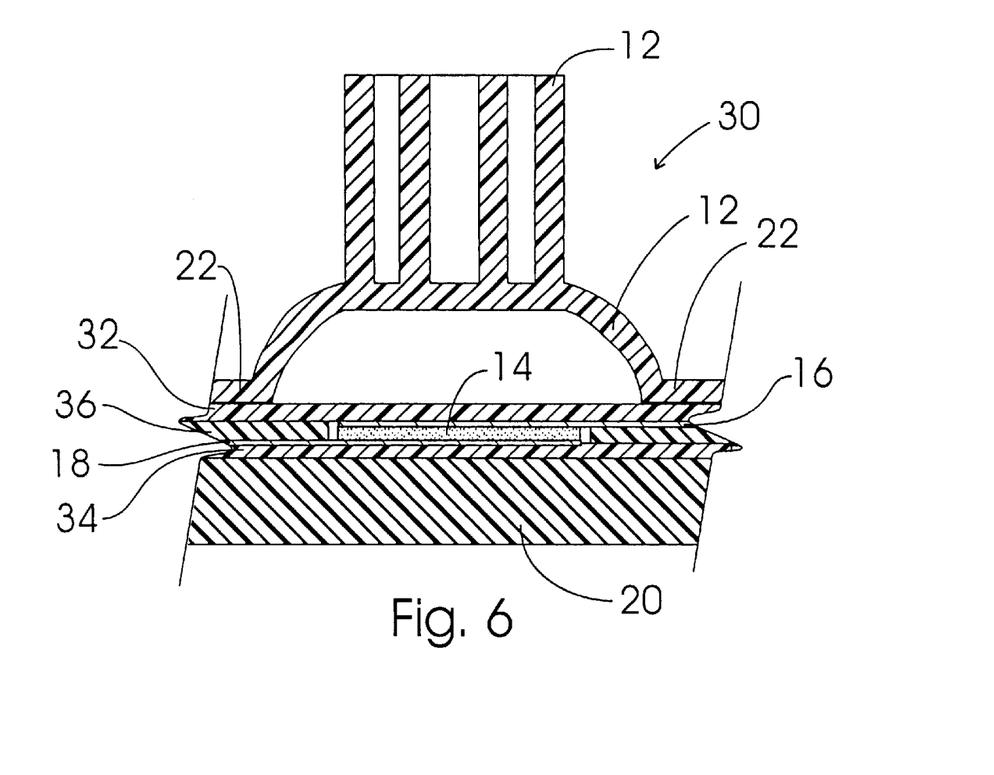
FIG. 6 shows a median cross section view of an elastomeric injection molded one-piece dome-cap using sensor. The active element is shown sandwiched between two membrane sheets which are separated by a center membrane sheet having a hole which is filled with the active element. The active element is shown beneath the underside center of the raised one-piece injection molded elastomeric dome-cap and below or outside of the dome-cap. In this illustration, the active element is shown neither carried by the dome-cap nor within the dome-cap.

FIG. 1 shows the most preferred sensor embodiment for use with or in conjunction with the present invention for such reasons as, ubiquitous familiarity, ready availability, proven durability, exceptional low cost and superior functionality. The superior functionality in comparison to the sensors of FIGS. 3 and 6 is in the fact that active element 14 is not in constant contact with conductive elements 16, 18 when dome-cap 12 is not depressed. This provides a positive deactivated state wherein no current can flow between conductive elements 16 and 18 when dome-cap 12 is not depressed. Injection molded dome-caps 12 are also commonly available having pre-engineered different tactile feedback producing levels.

Figure 2:
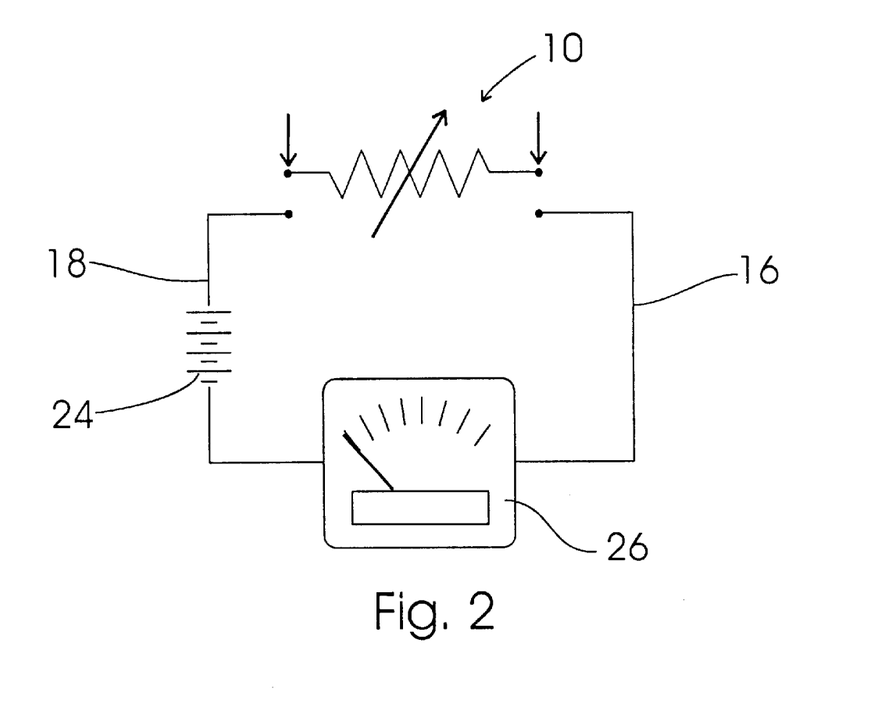
FIG. 2 shows a simple electrical circuit arranged to be an analog sensing circuit and utilizing the elastomeric dome-cap sensor of FIG. 1 as a pressure-sensitive variable-conductance sensor in accordance with the present invention.

FIG. 2 shows a simple electrical circuit structured to be an analog sensing circuit and utilizing the elastomeric dome-cap sensor 10 of FIG. 1 as a pressure-sensitive variable-conductance sensor. "Analog sensing circuit" is one which is structured to be at least in part manipulated or controlled by operation of an analog sensor. Also specifically shown is a battery 24 as an example of an electrical power source in the circuit, and a meter 26 including an electromagnetic coil engaged to a moveable indicating needle adjacent a printed scale or range gauge and capable of showing varying conductivity across the elastomeric dome-cap sensor 10. The dome-cap sensor 10 is indicated in the circuit as being in what could be considered a first or open state in this example. It should be understood that depressive pressure applied to the dome-cap 12 will move the raised portion of the dome-cap 12 toward base 20 sufficiently to bring the active element 14 into contact with both conductive elements 16, 18, and with sufficient pressure, and varying pressure well within a range readily applied by a human finger, the sensor 10 will be moved to second and third, etc. states with increasing applied pressure, and the different states in this example, because this is an analog circuit, will be indicated by the needle of the meter 26 being positioned left, right or at various states in between on the scale. The scale of meter 26 in this example includes marks which the needle moves through, in this example the needle moving to the right as the resistivity of the active element 14 decreases. It can be appreciated that while the marks are only printed on the scale, each mark represents a position the needle can pass through, and an electrical state of the sensor in which each can have a digital bit assignment associated therewith. In this example, higher pressure to dome-cap 12 and active element 14 would move the needle further to the right indicating lower resistivity, i.e. greater conductivity of active element 14. As those skilled in the art can appreciate and as will be further discussed below, digital bit assignments can be made for any level or state of conductivity and at least two bits of digital information are required for identifying more than two readable states.

FIG. 3 shows a median cross section view of an elastomeric dome-cap sensor 28 structured with the active element 14 mounted atop and spanning across the two proximal conductive elements 16, 18. The dome-cap 12 is shown in a raised position above the active element 14 and the sensor is shown in what can be used as or considered as a deactivated state or condition since no compressive pressure or force is being applied to active element 14. The pill or active element 14 of a typical prior art dome-cap sensor is a moderate to poor conductor when not compressed and becomes a much improved conductor under compression, and this means that if active element 14 of the FIG. 3 sensor is made of the same material commonly used as the active element in prior art dome-cap sensors, then when the dome-cap is raised as shown in FIG. 3, minimal current can flow between the two proximal conductive elements 16, 18. Such minimal current flow is to a lessor extent than if the active element were under compression, and so this lessor extent, if desired, can be treated as and assigned a bit assignment representing a deactivated state with the activated states being associated with the varying conductivity of the active element 14 when under varying degrees of compression. Active element 14 is shown in FIG. 3 within the dome-cap but not carried by the dome-cap 12.

Figure 4:
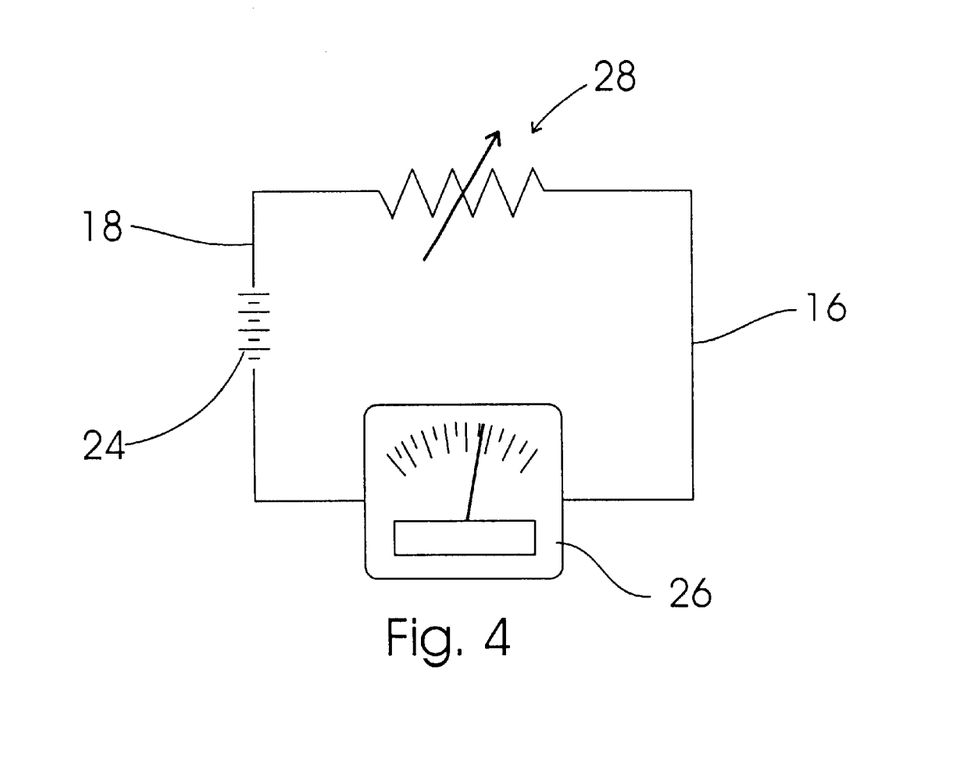
FIG. 4 shows a simple electrical circuit arranged to be an analog sensing circuit and utilizing the elastomeric dome-cap sensor of FIG. 3 as a variable-conductance sensor in accordance with the present invention.

FIG. 4 shows a simple electrical circuit arranged to be an analog sensing circuit and utilizing the elastomeric dome-cap sensor 28 of FIG. 3 as a pressure-sensitive variable-conductance sensor in combination with a meter 26. The needle of meter 26 is shown moved somewhat to the right to indicate compressive force being applied to active element 14 with dome-cap 12 depressed as shown in FIG. 5 wherein the sensor is in an activated state.

Figure 5:
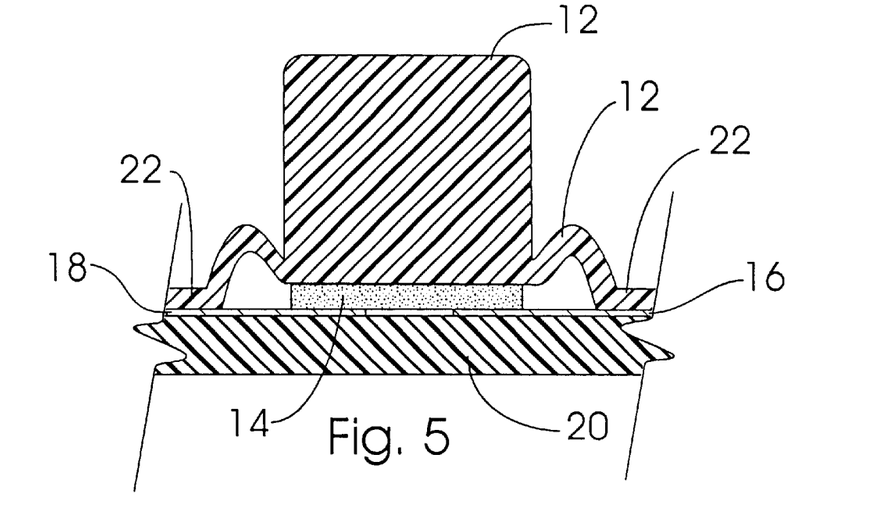
FIG. 5 shows a median cross section view of an elastomeric dome-cap sensor with the dome-cap depressed and representing the dome-cap sensors of either FIG. 1 or FIG. 3 in a state wherein compression or force of some level is applied to the active element. The active element is shown within the dome-cap and could be carried by the dome-cap as shown in FIG. 1, or within the dome-cap but not carried by the dome-cap as shown in FIG. 3.

FIG. 5 shows a median cross section view of an elastomeric dome-cap sensor with the sensor shown in the activated state or condition with the dome-cap 12 depressed and representing the dome-cap sensors of either FIG. 1 or FIG. 3 in the activated state, i.e., activated state herein meaning with the active element 14 is under a degree of compression from the depressed dome-cap 12. Deactivated state meaning the active element 14 is not being compressed by the dome-cap 12.

FIG. 6 shows a median cross section view of an elastomeric dome-cap sensor 30 in the deactivated state or condition with active element 14 sandwiched between two non-conductive flexible membrane sheets 32, 34 which are separated by a center membrane sheet 36 which includes a hole therein which contains active element 14. The membrane sheets are shown atop a stiff base 20 beneath the underside center of the raised dome-cap 12 which is mounted atop the upper most membrane sheet. Two proximal conductive elements 16, 18 are shown between the membrane sheets 32, 34 and contacting opposite sides of active element 14. The proximal conductive elements 16, 18 can be printed conductive ink on membranes 32 and 34. Active element 14 which is not carried by dome-cap 12 is shown beneath the underside center of the raised dome-cap 12 and outside of, or not within dome-cap 12, but rather is below the bottom surface of flange 22. The dome-cap 12 can be manually depressed to move toward base 20 to apply pressure on the nearest membrane sheet 32 which will flex and transfer depressive force into active element 14 which will alter it's conductivity relative to the degree of compression or force, thus altering the conductivity through active element 14 between proximal conductive elements 16, 18.

FIG. 6 additionally shows that dome-cap 12 can be manufactured with uniform wall thickness such as to accommodate certain materials which mold and perform in an improved manner when kept uniform in thickness, as opposed to those embodiments shown in FIGS. 1, 3 and 5 which have an upper portion of much greater thickness than the lower portion of the dome-cap 12.

The embodiment of FIG. 6 shows active element 14 sandwiched between conductive elements 16 and 18 as taught in the Mitchell U.S. Pat. No. 3,806,471 and further sandwiched between membrane sheets as shown in the Eventoff U.S. Pat. No. 4,315,238 as a bounceless On/Off switch. My addition of the elastomeric injection molded one-piece dome-cap 12 in this embodiment creates a novel sensor with some, but not all, of the above discussed advantages afforded to an injection-molded dome-cap sensor having analog or pressure sensitive properties. While the embodiment of FIG. 6 falls within the scope of the broadest definitions of this invention, it is not the most preferred sensor discussed herein for certain reasons such as: this embodiment is not the lowest cost manufacturing technology discussed herein, or the easiest to manufacture, or the best performing sensor embodiment described herein.

Figure 7:
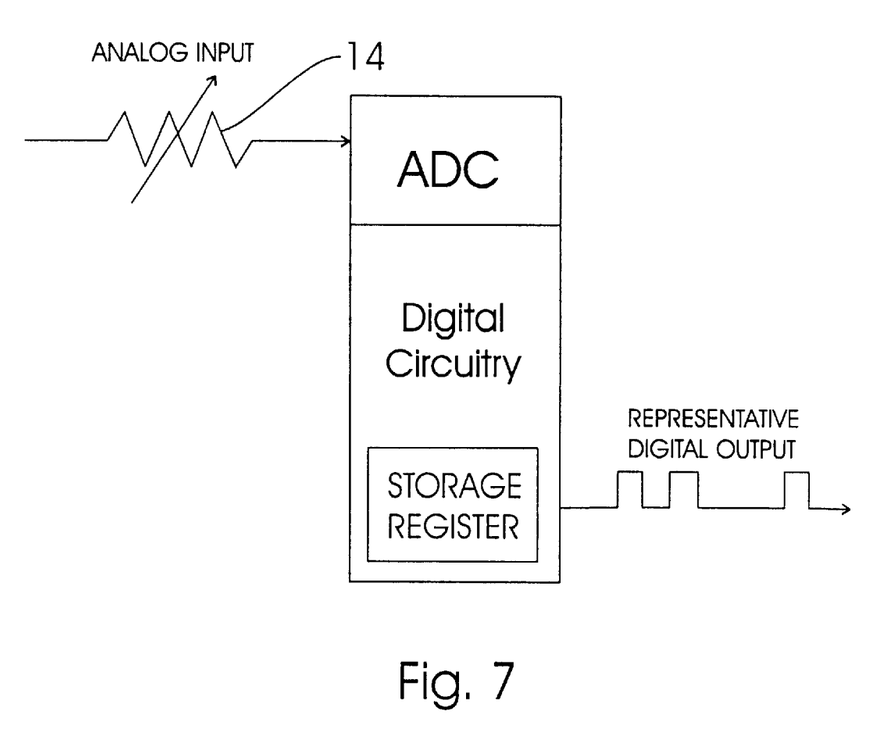
FIG. 7 shows an elastomeric dome-cap sensor indicated as a variable resistor connected to an analog-to-digital conversion circuitry (ADC) which is shown coupled to digital circuitry for storing and outputting digital information.

FIG. 7 shows a variable resistor representing active element 14 of any of the above described elastomeric dome-cap sensors such as 10, 28 or 30 connected to an analog-to-digital converter (ADC) or equivalent circuitry which is shown coupled to digital circuitry for temporarily storing in at least one storage register and outputting digital information which is representative of the read state of active element 14.

Those skilled in the art will recognize that the digital representation in FIG. 7 is one which would be in a completed circuit such as shown in FIGS. 2 and 4.

In order to gain the benefits of the present invention, manufacturers using prior art style dome-caps 12 will only need to apply new or modified circuitry on the circuit boards capable of reading any one of at least three readable states of the dome-cap sensor 10 indicative of at least three states of the dome-cap 12 and active element 14. Such readable states, for example, can be: 1) a first level of electrical resistance being relatively high resistance or open across the proximal conductive elements indicating the dome-cap as raised; 2) a second level of electrical resistance being less than the first level but allowing current flow between the proximal conductive elements and being indicative of the dome-cap being lightly depressed and lightly compressing the active element 14; and 3) a third level of electrical resistance being less than the first and second levels and allowing current flow between the proximal conductive elements 16, 18 and being indicative of the dome-cap being depressed and compressing (applying force) active element 14 more firmly or with greater pressure compared to the second level or state.

For the purposes of this disclosure the wording "storing, as digital information, a read state of the active element, the storing requiring at least two digital bits" or equivalent wording thereto, means that the active element 14, being variably conductive, i.e., variably resistive or variably rectifying, can achieve numerous possible states of electrical conductivity, and those states can be described with digital information (bits). The number of bits necessary (required) to describe a specific possible number of states is well known by those skilled in the art, as the possible described states is a factor of the bits required to describe such states. For example: two different states require at least one digital bit to describe, On or OFF, the bit is a zero or a one; three different states require at least two digital bits to describe; and three bits are required to describe a minimum of 5 states; to describe a somewhat smoothly variable active element having 256 states requires at least eight bits of digital information, etc. The term storing means that a representative value of a read state of the active element 14 is at least stored in some register at some time within the digital electronics processing the status of the active element 14.

The conductive pill or active element 14 of typical prior art elastomeric dome-cap sensors is variably conductive and pressure-sensitive to a degree quite useful in an analog sensing circuit as herein disclosed. Such prior art active elements are believed to be primarily carbon within an elastomeric or rubbery binder. However, within the scope of the invention, variable conductance can be achieved with other materials having either variable resistive properties or variable rectifying properties. For the purpose of this disclosure and the claims, variable-conductance and equivalents thereto means either variably resistive or variably rectifying. Material having these qualities can be achieved utilizing various chemical compounds or formulas some of which I will herein detail for example. Additional information regarding such materials can be found in U.S. Pat. No. 3,806,471 issued to R. J. Mitchell describing various feasible pressure-sensitive variable-conductance material formulas which can be utilized.

While it is generally anticipated that variable resistive type materials for defining active element 14 are optimum for use in pressure sensor(s), variable rectifying materials are also usable within the scope of the present invention.

An example formula or compound having variable rectifying properties can be made of any one of the active materials copper oxide, magnesium silicide, magnesium stannide, cuprous sulfide, (or the like) bound together with a rubbery or elastomeric type binder having resilient qualities such as silicone adhesive or the like.

An example formula or compound having variable resistive properties can be made of the active material tungsten carbide powder (or other suitable material such as molybdenum disulfide, sponge iron, tin oxide, boron, and carbon powders, etc.) bound together with a rubbery or elastomeric type binder such as silicone rubber or the like having resilient qualities. The active materials may be in proportion to the binder material typically in a rich ratio such as 80% active material to 20% binder by volume, but can be varied widely from this ratio dependent on factors such as voltages to be applied, level or resistance range desired, depressive pressure anticipated, material thickness of the active element, surface contact area between the variable-conductance material and conductive elements of the circuit, binder type, manufacturing technique and specific active material used. I have found that tungsten carbide powder bound with a rubbery or elastomeric type binder such as silicone rubber or the like provides a wider range of varying resistance than the typical carbon pill or active element 14 of the prior art dome-cap switches and thus may be preferred particularly for application requiring high resolution. Also, the tungsten carbide based active element is more predictable in it's pressure sensitive varying conductivity over a wider temperature range than the typical carbon based active element used in prior art dome-cap switches.

From the drawings and above details it can be appreciated that the present invention can readily be described in numerous ways including the following descriptions provided for the sake of positive clarity and which reiterate certain details, expand on and combine others. For example, the invention from one view point is an improved method for using the elastomeric injection molded dome-cap sensor of the type wherein the elastomeric injection molded dome-cap 12 carries the active element 14 which is positioned over a portion of an electronic circuit. The elastomeric injection molded dome-cap being depressible for transferring force into active element 14, with the active element when under force electrically contacting proximal conductive elements of the electronic circuit. The electronic circuit being structured for reading the active element as being in any one of a plurality of states, the plurality of states in the prior art being two states only, On or Off;

wherein the novel improvement disclosed herein comprises the steps of:

depressing variably on the elastomeric injection molded dome-cap so as to apply force against the active element of various degrees;

reading the active element as being in any one of at least three readable states; and storing, as digital information, a read state of the active element, the storing as digital information requiring at least two digital bits. The invention can of course be more narrowly or broadly described as indicated by this disclosure as a whole, and can be described in different manners or from different view points such as in the below examples.

From another view point, the invention is an improved method for reading the elastomeric injection molded dome-cap sensor of the type wherein the active element 14 is positioned within the elastomeric injection molded dome-cap 12 which is positioned over a portion of an electronic circuit such as conductive elements 16 and 18 of the circuit.

The elastomeric injection molded dome-cap being depressible for transferring force into the active element with the active element when under force electrically contacting conductive elements 16, 18 of the electronic circuit. The electronic circuit being structured for reading the active element as being in any one of two readable states in the prior art; but with the present invention wherein the improvement comprises the step:

structuring the electronic circuitry for reading the active element as being in any one of at least three readable states. The invention can be more narrowly or broadly described as indicated by this disclosure as a whole, and can be described in different manners or from different view points such as in the below examples.

From another view point, the invention is an improved method for storing a read state of the elastomeric injection molded dome-cap sensor of the type wherein the active element 14 is positioned within elastomeric injection molded dome-cap 12 which is positioned over a portion of an electronic circuit, the portion being proximal conductive element 16 and 18 or equivalents thereto. The elastomeric injection molded dome-cap 12 being depressible for transferring force into the active element 14 with the active element when under force electrically contacting the conductive elements 16, 18 of the electronic circuit. The electronic circuit being structured for reading the active element as being in any one of a plurality of states, and storing a read state as digital information, the storing of the read state requiring one digital bit only in the prior art; but with the present invention wherein the improvement comprises the step:

storing, as digital information, a read state of the active element, the storing of the read state requiring at least two digital bits, because more than two states are read by the electronic circuit. Three different states require at least two digital bits to describe; and five different states require at least three bits to describe; likewise, nine states requires at least four bits to describe, seventeen states requires at least five bits and a smoothly variable or higher resolution range of 129 to 256 states requires at least eight bits to describe.

From another view point, the invention is an improved method of depressing the elastomeric injection molded dome-cap sensor of the sensor type wherein the active element 14 is positioned within the elastomeric injection molded dome-cap 12 which is positioned over a portion of an electronic circuit, the portion being conductive element 16, 18 or equivalents thereto. The elastomeric injection molded dome-cap 12 being depressible for transferring force into active element 14 with the active element when under force electrically contacting conductive elements of the electronic circuit. The electronic circuit being structured for outputting information representing states of the active element; but in the present invention wherein the improvement comprises the step of:

depressing the elastomeric injection molded dome-cap 12 (sensor) with varying force to apply varying force to active element 14 for causing the electronic circuit to output information representing at least three states representative of the varying force. The invention can be more narrowly or broadly described as indicated by this disclosure as a whole, and can be described in different manners or from different view points such as in the below examples.

From another view point, the invention is an improved analog sensing circuit of the type including a user manipulable variable-conductance sensor and circuitry for reading the sensor; wherein the improvement in accordance with the present invention comprises: the variable-conductance sensor being the elastomeric injection molded one-piece dome-cap 12 positioned over the pressure-sensitive variable-conductance material, i.e., active element 14, and more narrowly with the active element 14 positioned within the dome-cap, and even more specifically with the dome-cap being of molded thermoset rubbery (or polymer flexible material) material and carrying the active element. This arrangement could, as described above, also employ the injection molded dome-cap of the specific type which produces a user discernable tactile feedback upon depressive pressure being applied to the dome-cap. Tactile feedback is highly desirable and beneficial in some applications, but not all applications.

From another view point, the invention is an improved electrical circuit of the type having circuitry for reading states of the active element 14 within the elastomeric injection molded one-piece dome-cap 12; wherein the improvement in accordance with the present invention comprises: the electrical circuit structured for reading any one of at least three readable states of the active element 14, and preferably many more states to allow for higher resolution, such as nine states or 129 states for examples. More narrowly the active element 14 is carried by the dome-cap 12 and the dome-cap is made of molded thermoset rubbery material. This arrangement could, as described above, also employ the injection molded dome-cap of the specific type which produces a user discernable tactile feedback.

The invention from another view point is an improved method for outputting a read state of the elastomeric injection molded dome-cap sensor of the type wherein the active element 14 is positioned within the elastomeric injection molded one-piece dome-cap 12 which is positioned over a portion of an electronic circuit. The elastomeric injection molded dome-cap being depressible for transferring force into the active element with the active element when under force electrically contacting conductive elements such as 16 and 18 of the electronic circuit. The electronic circuit is structured for reading the active element as being in any one of a plurality of readable states, and outputting a read state as digital information; the outputting requiring at least one digital bit in accordance with the prior art, but in accordance with the present invention the improvement comprises: outputting from electronic circuitry, as digital information, a read state of the active element, the outputting of the read state requiring at least two digital bits in accordance with the invention. The invention can of course be more narrowly or broadly described as indicated by this disclosure as a whole. Clearly, the ability to read a higher number of states is advantageous in representing a higher resolution of depressive pressure applied to the dome-cap sensor.

From a reading of this disclosure it can be appreciated that it is quite possible to use a very inexpensive and durable elastomeric dome-cap sensor as a pressure-sensitive variable-conductance sensor, or as a pressure-sensitive variable-conductance sensor which includes tactile feedback in association with electronic circuitry structured for control or manipulation by the elastomeric dome-cap sensor applied as an analog sensor. Those skilled in the art will appreciate that a very inexpensive pressure-sensitive variable-conductance sensor would be useful and of benefit.

Although I have specifically described the best modes of the invention for example, it should be understood that changes in the specifics described and shown can clearly be made without departing from the true scope of the invention in accordance the broadest possible reasonable interpretation of the appended claims.

I claim:

1. A variable sensor, said variable sensor comprising:
a rigid support board, said board at least in part supporting a sheet, said sheet positioned between said board and a depressible resilient dome cap, said dome cap structured to provide, upon depression of said dome cap, a snap-through threshold tactile feedback to a human user.

2. A variable sensor according to claim 1 wherein said board is a circuit board supporting electrical circuit traces, and
said variable sensor is combined with means for variably controlling imagery according to variable depressive force applied by the human user.

3. A variable sensor according to claim 2 wherein said dome cap has a deformable surface having an apex located to contact said sheet.

4. A variable sensor according to claim 3 wherein said sheet supports electrically conductive material.

5. A variable sensor according to claim 4 wherein said conductive material is located to contact said circuit traces.

6. A variable sensor according to claim 5 wherein said circuit traces are interdigitated.

7. A variable sensor according to claim 5 wherein said imagery is an electronic game displayed by a television.

8. A variable sensor according to claim 2 wherein said variable sensor is positioned at least in part within a hand operated device, said device includes a first pivotally mounted button, said first pivotally mounted button positioned to be operated by a first human finger of the human user.

9. A variable sensor according to claim 8 wherein said device includes a second pivotally mounted button, said second pivotally mounted button positioned to be operated by a second human finger of the human user.

10. A variable sensor according to claim 9 wherein said device includes means for providing active tactile feedback.

11. A variable sensor according to claim 10 wherein said first pivotally mounted button is variably depressible to at least in part variably control said imagery.

12. A variable sensor according to claim 11 wherein said second pivotally mounted button is variably depressible to at least in part variably control said imagery, said imagery displayed by a television.

13. A variable sensor according to claim 12 wherein said variable sensor outputs signals representing On/off data and proportional data.

14. A variable sensor according to claim 2 wherein said variable sensor is positioned at least in part within a hand operated device, said hand operated device includes a right-hand area and a left-hand area, said variable sensor is located in said right-hand area, said imagery is an electronic game displayed by a television.

15. A variable sensor according to claim 14 wherein said variable sensor is activated by depression of a thumb depressible button, said thumb depressible button located in said right-hand area and positioned to be depressed by a right hand thumb of the user.

16. A variable sensor according to claim 15 wherein said variable sensor outputs signals representing On/off data and proportional data.

17. A variable sensor according to claim 16 wherein said hand operated device includes a second variable sensor located in said right-hand area.

18. A variable sensor according to claim 17 wherein said hand operated device includes a third variable sensor and a fourth variable sensor, the second, third and fourth sensors associated with second, third and fourth independent buttons, the buttons located in said right-hand area positioned to be depressed by a right-hand thumb of the user.

19. A variable sensor according to claim 1 wherein electrically conductive material is carried by said dome cap, and
said variable sensor is combined with means for variably controlling imagery according to variable depressive force applied by a human finger of the human user.

20. A variable sensor according to claim 19 wherein said conductive material has a deformable substantially convexed surface having an apex.

21. A variable sensor according to claim 20 wherein said variable sensor is structured in combination with means for providing active tactile feedback.

22. A variable sensor according to claim 1 wherein said sheet is an electrically non-conductive sheet supporting electrically conductive material, and
said variable sensor is combined with means for variably controlling imagery according to variable depressive force applied by a human finger of the human user.

23. A variable sensor according to claim 22 wherein said conductive material contacts circuit traces.

24. A variable sensor according to claim 23 wherein said circuit trace s comprise a first circuit trace and a second circuit trace, said conductive material contacting between said first circuit trace an d said second circuit trace.

25. A variable sensor according to claim 24 wherein a four way rocker is located in said left-hand area of said housing.

26. A variable sensor according to claim 25 wherein said imagery is an electronic game displayed by a television.

27. A variable sensor according to claim 24 wherein said variable sensor is structured in combination with means for providing active tactile feedback.

28. A variable sensor according to claim 27 wherein said variable sensor outputs signals representing On/off data and proportional data.

29. A variable sensor according to claim 27 wherein said variable sensor is positioned at least in part within a hand-held housing, and said means for providing active tactile feedback is also at least in part within said housing.

30. A variable sensor according to claim 29 wherein said imagery is an electronic game displayed by a television.

31. A variable sensor according to claim 30 wherein a second variable sensor is positioned within said right-hand area of said housing, said second variable sensor actuated by variable depression of a second single individual button.

32. A variable sensor according to claim 31 wherein a four way rocker is located in said left-hand area of said housing.

33. A variable sensor according to claim 32 wherein a third variable sensor is positioned within said right-hand area of said housing, said third variable sensor actuated by variable depression of a third single individual button, and a fourth variable sensor is positioned within said right-hand area of said housing, said fourth variable sensor actuated by variable depression of a fourth single individual button.

34. A variable sensor operated by depression of a single button, said single button depressed by a finger of a user, said variable sensor combined with means for controlling game imagery, said variable sensor comprising:
sensor means for creating a proportional output, said proportional output representing varying depression applied by the finger of the user, said proportional output at least in part for controlling the game imagery,
feedback means at least for providing a snap-through threshold tactile feedback to the user.

35. A variable sensor according to claim 34 wherein said feedback means further comprises means for active tactile feedback.

36. A variable sensor according to claim 34 wherein said sensor means includes a resilient dome cap depressible by said button.

37. A variable sensor according to claim 36 wherein said feedback means comprises said dome cap supplying said snap-through threshold tactile feedback through said button to the finger of the user.

38. A variable sensor according to claim 37 wherein said dome cap comprises rubber material.

39. A variable sensor according to claim 37 wherein said dome cap comprises metallic material.

40. A variable sensor according to claim 37 wherein said variable sensor is located in a two-hand operated device, and said sensor means includes a first proportional sensor activated by depression of said button, and a second proportional sensor activated by depression of a second button.

41. A variable sensor according to claim 40 wherein the buttons and the sensors are located in a right-hand area of said two-hand operated device.

42. A variable sensor according to claim 41 wherein the buttons are positioned for thumb depression.

43. A variable sensor according to claim 42 wherein said feedback means comprises means for active tactile feedback.

44. A variable sensor combined with means for variably controlling electronic imagery according to variable depressive force applied to said variable sensor by only a single human finger, said variable sensor comprising:

a depressible resilient dome cap, said dome cap structured to provide, upon depression of said dome cap, a snap-through threshold tactile feedback to the human finger.

45. A variable sensor according to claim 44 wherein electrically conductive material is carried by said dome cap.

46. A variable sensor according to claim 45 wherein said conductive material deforms under said depressive force.

47. A variable sensor according to claim 46 wherein said variable sensor is located in a right-hand area of a housing, and a four way rocker is located in a left-hand area of said housing.

48. A variable sensor according to claim 47 wherein said variable sensor is structured in combination with means for providing active tactile feedback.

49. A variable sensor according to claim 47 wherein said variable sensor outputs signals representing On/off data and proportional data.

50. A variable sensor according to claim 49 wherein said variable sensor is structured in combination with means for providing active tactile feedback.

51. A variable sensor according to claim 50 wherein said variable sensor is activatable by depression of a button, said sensor and said button are positioned in a right-hand area of a housing, and a four way rocker is positioned in a left-hand area of said housing.

52. A variable sensor according to claim 51 wherein said electronic imagery is an electronic game displayed by a television.

53. A variable sensor according to claim 52 wherein said housing is hand-held, and said means for providing active tactile feedback is located within said housing.

54. A variable sensor according to claim 53 wherein a second variable sensor is positioned within said housing, said second variable sensor actuated by variable depression of a second button, said second button located in said right-hand area of said housing.

55. A variable sensor according to claim 54 wherein a third variable sensor is positioned within said housing, said third variable sensor actuated by variable depression of a third single individual button positioned in said right-hand area of said housing, and a fourth Variable sensor is positioned within said housing, said fourth variable sensor actuated by variable depression of a fourth single individual button positioned in said right-hand area of said housing.

56. A method of using a variable pressure analog sensor, depressed by a human thumb, to control variable movement of imagery in an electronic game, said method including the steps:

a) decreasing pressure on said analog sensor, followed by b) receiving a soft snap tactile feedback, followed by c) increasing pressure on said analog sensor, said increasing pressure-applied according to said imagery and substantially because of said receiving a soft snap tactile feedback.

57. A method according to claim 56 wherein said variable movement of imagery is movement of a viewpoint through three-dimensional graphics.

58. A method according to claim 56 wherein said variable movement of imagery is variable movement of a game object.

59. A method according to claim 58 wherein said game object is a three-dimensional game object located within a three-dimensional graphics display.

60. A method according to claim 56 wherein said variable movement of imagery is movement of a game character in three-dimensional graphics.

61. A method of using a variable sensor depressed by a human finger to variably control movement in an electronic game, said method including the steps:

a) depressing said variable sensor with varying pressure;

b) receiving a user discernable a snap-through threshold tactile feedback.

62. A method according to claim 61 wherein said depressing includes depressing harder to make a controllable game character, of said electronic imagery, jump higher.

63. A method according to claim 61 wherein said depressing includes increasing depressive pressure to make a simulated race car, of said electronic imagery, slow according to the increasing depressive pressure.

64. A method of variably controlling electronic imagery by using a variable sensor, said method including the steps:

a) pressing, with a human finger, a button associated with the variable sensor;

b) receiving, through said finger, a snap-through threshold tactile feedback.

65. A method of controlling electronic imagery according to claim 64 wherein said pressing includes pressing harder to make a controllable game character, of said electronic imagery, jump higher.

66. A method of controlling electronic imagery according to claim 64 wherein said pressing includes increasing pressure to make a simulated race car, of said electronic imagery, slow according to the increasing pressure.

* * * * *

(12) INTER PARTES REEXAMINATION CERTIFICATE (0343rd)
United States Patent
Armstrong (10) Number: US 6,344,791 C1
(45) Certificate Issued: *Feb. 14, 2012

(54) VARIABLE SENSOR WITH TACTILE FEEDBACK

(75) Inventor: Brad A. Armstrong, Paradise, CA (US)

(73) Assignee: Anascape, Ltd., Tyler, TX (US)

Reexamination Request:
No. 95/000,217, May 7, 2007
No. 95/000,222, May 10, 2007

Reexamination Certificate for:
Patent No.: 6,344,791
Issued: Feb. 5, 2002
Appl. No.: 09/599,095
Filed: Jun. 21, 2000

(*) Notice: This patent is subject to a terminal disclaimer.

Related U.S. Application Data

(63) Continuation of application No. 09/122,269, filed on Jul. 24, 1998, now Pat. No. 6,135,886.

(51) Int. Cl.
*H01C 10/12* (2006.01)
*H01C 10/10* (2006.01)

(52) U.S. Cl. .............................. 338/114; 463/37; 338/99

(58) Field of Classification Search .................... None
See application file for complete search history.

(56) References Cited

To view the complete listing of prior art documents cited during the proceedings for Reexamination Control Numbers 95/000,217 and 95/000,222, please refer to the USPTO's public Patent Application Information Retrieval (PAIR) system under the Display References tab.

*Primary Examiner* — Beverly M. Flanagan (57) ABSTRACT

Structures and methods for using an analog sensor in combination with a user discernable snap-through threshold feedback, the feedback may be created by a dome-cap element of the sensor. The threshold feedback, sensed by a human user's finger, indicates activation and deactivation of the analog sensor. Tactile analog sensor(s) are structurally combined with: a second kind of tactile feedback referred to as active tactile feedback, flexible sheet sensor elements, pivotal analog buttons, and game imagery controls.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-66 are cancelled.

* * * * *